(12) United States Patent
Chen

(10) Patent No.: US 11,175,479 B2
(45) Date of Patent: Nov. 16, 2021

(54) OPTICAL LENS

(71) Applicant: ABILITY ENTERPRISE CO., LTD, New Taipei (TW)

(72) Inventor: Chia-Hung Chen, New Taipei (TW)

(73) Assignee: ABILITY ENTERPRISE CO., LTD, New Taipei (TW)

( * ) Notice: Subject to any disclaimer, the term of this patent is extended or adjusted under 35 U.S.C. 154(b) by 121 days.

(21) Appl. No.: 16/043,138

(22) Filed: Jul. 23, 2018

(65) Prior Publication Data

US 2019/0049698 A1  Feb. 14, 2019

(30) Foreign Application Priority Data

Aug. 14, 2017 (TW) .................................. 106127479

(51) Int. Cl.
   G02B 13/00   (2006.01)
   G02B 9/64    (2006.01)
(52) U.S. Cl.
   CPC ........... G02B 13/0045 (2013.01); G02B 9/64 (2013.01)
(58) Field of Classification Search
   CPC ........... G02B 13/0045; G02B 13/0055; G02B 13/04; G02B 13/002; G02B 9/64
   USPC .......................... 359/708, 749–751, 754–755
   See application file for complete search history.

(56) References Cited

U.S. PATENT DOCUMENTS

| 4,018,511 A * | 4/1977 | Takahashi ................. G02B 9/64 359/751 |
| 2011/0317285 A1* | 12/2011 | Ohashi .................... G02B 9/64 359/753 |
| 2012/0212836 A1* | 8/2012 | Hsieh ................. G02B 13/0045 359/708 |
| 2014/0043694 A1* | 2/2014 | Tsai ....................... G02B 9/64 359/708 |
| 2015/0185441 A1* | 7/2015 | Liao ....................... G02B 9/64 348/335 |
| 2017/0108662 A1* | 4/2017 | Lee ....................... G02B 5/005 |
| 2018/0031807 A1* | 2/2018 | Chen ..................... G02B 9/64 |
| 2018/0164553 A1* | 6/2018 | Son .................... G02B 13/0045 |
| 2018/0188493 A1* | 7/2018 | Huang ................. H04N 5/2253 |
| 2018/0314036 A1* | 11/2018 | Li ....................... G02B 3/0062 |
| 2018/0356617 A1* | 12/2018 | Yamada ................ G02B 9/64 |

(Continued)

FOREIGN PATENT DOCUMENTS

| CN | 202886720 U | 4/2013 |
| CN | 106291882 A | 1/2017 |

(Continued)

*Primary Examiner* — Jordan M Schwartz
(74) *Attorney, Agent, or Firm* — CKC & Partners Co., LLC

(57) ABSTRACT

An optical lens in order from an object side to an image-forming side includes a first lens, a second lens, a third lens, a fourth lens, a fifth lens, a sixth lens, and a seventh lens. An object-side surface of the first lens has a curvature radius R1, an image-side surface of the first lens has a curvature radius R2, an object-side surface of the third lens has a curvature radius R5, an image-side surface of the third lens has a curvature radius R6, an image-side surface of the seventh lens has an inflection point, a distance between the inflection point and an optical axis is h14, and the seventh lens has a radius H14. The optical lens satisfies at least one of the following conditions:

$0.01 \leq |R2/R1|$; $|R2/R1| \leq 0.6$; $0 \leq |R5/R6|$; $|R5/R6| \leq 2$; $0.3 \leq |h14/H14|$; and $|h14/H14| \leq 0.9$.

19 Claims, 7 Drawing Sheets

(56) References Cited

U.S. PATENT DOCUMENTS

| | | | |
|---|---|---|---|
| 2019/0187442 A1* | 6/2019 | Jia | G02B 13/06 |
| 2019/0250382 A1* | 8/2019 | Lee | G02B 9/62 |
| 2020/0012078 A1* | 1/2020 | Kuo | G02B 9/64 |

FOREIGN PATENT DOCUMENTS

| | | |
|---|---|---|
| CN | 106324797 A | 1/2017 |
| CN | 106556913 A | 4/2017 |
| JP | 2014145961 A | 8/2014 |
| JP | 2015055728 A | 3/2015 |
| JP | 2016194653 A | 11/2016 |
| TW | 201407187 A | 2/2014 |
| TW | 201606345 A | 2/2016 |
| TW | I545366 B | 8/2016 |
| TW | I612328 B | 1/2018 |

\* cited by examiner

| lens no. | surface no. | curvature radius(mm) | thickness (mm) | refractive index | abbe number | radius (mm) | conic constant |
|---|---|---|---|---|---|---|---|
| L1 | S1 | 9.5 | 0.3 | 1.7 | 50 | 3.8 | 0 |
|  | S2 | 4.0 | 0.1 |  |  | 3.2 | 0 |
| L2 | S3 | 5.8 | 0.4 | 1.5 | 55 | 3.2 | 6.9 |
|  | S4 | 2.0 | 0.3 |  |  | 2.5 | 0.5 |
| L3 | S5 | 3.0 | 0.9 | 1.8 | 40 | 2.5 | 0 |
|  | S6 | -69.2 | 0.4 |  |  | 2.0 | 0 |
| St | St | ∞ | 0.1 |  |  | 1.2 | 0 |
| L4 | S7 | 5.2 | 0.6 | 1.5 | 55 | 1.4 | -28.8 |
|  | S8 | -1.7 | 0.0 |  |  | 1.7 | 1.0 |
| L5 | S9 | -3.2 | 0.3 | 1.6 | 24 | 1.8 | 6.1 |
|  | S10 | 6.1 | 0.1 |  |  | 2.0 | -1.0 |
| L6 | S11 | -106.3 | 1.1 | 1.5 | 55 | 2.2 | 71.1 |
|  | S12 | -2.6 | 0.4 |  |  | 2.6 | 2.3 |
| L7 | S13 | 2.9 | 1.1 | 1.5 | 55 | 3.0 | -28.9 |
|  | S14 | 1.4 | 0.6 |  |  | 4.9 | -4.9 |
| C | S15 | ∞ | 0.15 | 1.5 | 65 | 5.3 | 0 |
|  | S16 | ∞ | 0.26 |  |  | 5.4 | 0 |
|  | I | ∞ |  |  |  | 5.7 | 0 |

Fig. 4A

|  | A2 | A4 | A6 | A8 | A10 | A12 | A14 | A16 |
|---|---|---|---|---|---|---|---|---|
| S3 | 0.000 | 0.028 | -0.010 | 0.000 | 0.001 | 0.000 | 0.000 | 0.000 |
| S4 | 0.000 | 0.038 | 0.000 | -0.014 | 0.002 | 0.006 | -0.004 | 0.001 |
| S7 | 0.000 | -0.029 | -0.094 | -0.053 | -0.454 | 2.432 | -8.083 | 8.977 |
| S8 | 0.000 | -0.046 | -0.043 | -0.004 | 0.062 | -0.451 | 0.193 | 0.502 |
| S9 | 0.000 | -0.058 | 0.059 | 0.084 | -0.004 | -0.778 | 1.844 | -1.073 |
| S10 | 0.000 | -0.033 | -0.020 | 0.130 | -0.166 | 0.163 | -0.048 | -0.012 |
| S11 | 0.000 | 0.016 | -0.048 | 0.066 | 0.020 | -0.030 | 0.017 | -0.008 |
| S12 | 0.000 | -0.118 | 0.210 | 0.171 | 0.086 | -0.001 | -0.014 | 0.004 |
| S13 | 0.000 | -0.164 | 0.053 | -0.008 | -0.003 | 0.001 | 0.001 | 0.000 |
| S14 | 0.000 | -0.058 | 0.020 | -0.005 | 0.001 | 0.000 | 0.000 | 0.000 |

Fig. 4B

| lens no. | surface no. | curvature radius(mm) | thickness (mm) | refractive index | abbe number | radius (mm) | conic constant |
|---|---|---|---|---|---|---|---|
| L1 | S1 | 14.7 | 0.4 | 1.7 | 50 | 4.4 | 0 |
|  | S2 | 4.2 | 0.1 |  |  | 3.7 | 0 |
| L2 | S3 | 5.6 | 0.5 | 1.5 | 55 | 3.6 | 5.5 |
|  | S4 | 2.0 | 0.6 |  |  | 2.8 | 0.4 |
| L3 | S5 | 2.9 | 1.1 | 1.8 | 40 | 2.7 | 0 |
|  | S6 | ∞ | 0.4 |  |  | 2.1 | 0 |
| St | St | ∞ | 0.1 |  |  | 1.3 | 0 |
| L4 | S7 | 5.3 | 0.6 | 1.5 | 55 | 1.5 | -4.2 |
|  | S8 | -1.8 | 0.1 |  |  | 1.8 | 0.9 |
| L5 | S9 | -3.1 | 0.5 | 1.6 | 24 | 1.9 | 8.8 |
|  | S10 | 5.5 | 0.1 |  |  | 2.3 | -31.7 |
| L6 | S11 | -150.0 | 1.1 | 1.5 | 55 | 2.5 | -70.7 |
|  | S12 | -2.5 | 0.4 |  |  | 2.8 | 2.2 |
| L7 | S13 | 2.7 | 1.0 | 1.5 | 55 | 3.0 | -26.4 |
|  | S14 | 1.4 | 0.6 |  |  | 4.5 | -5.5 |
| C | S15 | ∞ | 0.21 | 1.5 | 65 | 5.1 | 0 |
|  | S16 | ∞ | 0.37 |  |  | 5.2 | 0 |
|  | I | ∞ |  |  |  | 5.6 | 0 |

Fig. 5A

|  | A2 | A4 | A6 | A8 | A10 | A12 | A14 | A16 |
|---|---|---|---|---|---|---|---|---|
| S3 | 0.000 | 0.032 | -0.009 | 0.000 | 0.001 | 0.000 | 0.000 | 0.000 |
| S4 | 0.000 | 0.043 | -0.001 | -0.013 | 0.003 | 0.005 | -0.004 | 0.001 |
| S7 | 0.000 | -0.020 | -0.056 | -0.068 | -0.393 | 2.616 | -6.999 | 6.082 |
| S8 | 0.000 | -0.032 | -0.050 | -0.068 | 0.090 | -0.232 | -0.045 | 0.405 |
| S9 | 0.000 | -0.084 | 0.025 | 0.077 | -0.033 | -0.816 | 1.875 | -0.966 |
| S10 | 0.000 | -0.048 | -0.023 | 0.122 | -0.177 | 0.151 | -0.040 | -0.006 |
| S11 | 0.000 | 0.019 | -0.050 | 0.061 | 0.019 | -0.033 | 0.013 | -0.003 |
| S12 | 0.000 | -0.119 | 0.211 | -0.169 | 0.085 | -0.001 | -0.014 | 0.004 |
| S13 | 0.000 | -0.166 | 0.049 | -0.007 | -0.003 | 0.001 | 0.001 | 0.000 |
| S14 | 0.000 | -0.067 | 0.021 | -0.006 | 0.001 | 0.000 | 0.000 | 0.000 |

Fig. 5B

| lens no. | surface no. | curvature radius(mm) | thickness (mm) | refractive index | abbe number | radius (mm) | conic constant |
|---|---|---|---|---|---|---|---|
| L1 | S1 | 26.16 | 1.68 | 1.7 | 54 | 13.3 | 0 |
|  | S2 | 5.34 | 2.87 |  |  | 9.1 | 0 |
| L2 | S3 | -63.27 | 3.50 | 1.8 | 37 | 9.0 | 0 |
|  | S4 | -11.82 | 0.30 |  |  | 8.8 | 0 |
| L3 | S5 | 4.07 | 0.91 | 1.5 | 55 | 6.3 | 0 |
|  | S6 | 2.66 | 4.13 |  |  | 5.0 | -0.67 |
| St | St | ∞ | 0.10 |  |  | 2.6 | 0 |
| L4 | S7 | 4.85 | 1.94 | 1.5 | 81 | 3.0 | 0 |
|  | S8 | -5.02 | 1.94 |  |  | 3.7 | 0 |
| L5 | S9 | -2.36 | 0.70 | 1.6 | 23 | 3.8 | 0 |
|  | S10 | -7.32 | 0.15 |  |  | 4.8 | 0 |
| L6 | S11 | -1135.15 | 1.50 | 1.5 | 55 | 5.5 | 0 |
|  | S12 | -4.30 | 0.15 |  |  | 5.9 | 0 |
| L7 | S13 | 3.83 | 1.40 | 1.5 | 55 | 6.6 | 0 |
|  | S14 | 4.23 | 2.00 |  |  | 7.1 | 0 |
| F | S15 | ∞ | 0.30 | 1.5 | 64 | 7.5 | 0 |
|  | S16 | ∞ | 0.40 |  |  | 7.6 | 0 |
| C | S17 | ∞ | 0.50 | 1.5 | 64 | 7.6 | 0 |
|  | S18 | ∞ | 0.53 |  |  | 7.7 | 0 |
|  | I | ∞ |  |  |  | 7.8 | 0 |

Fig. 6A

|  | A2 | A4 | A6 | A8 | A10 | A12 | A14 | A16 |
|---|---|---|---|---|---|---|---|---|
| S5 | 0 | 3.0E-03 | -2.5E-04 | -5.5E-05 | 5.1E-06 | -9.3E-08 | 0 | 0 |
| S6 | 0 | 8.6E-03 | -1.8E-04 | -3.1E-04 | 4.4E-05 | -2.2E-06 | 3.8E-08 | 0 |
| S7 | 0 | -4.2E-03 | -9.6E-04 | -3.8E-04 | 3.9E-05 | -4.6E-05 | 0 | 0 |
| S8 | 0 | -5.6E-03 | -1.5E-03 | -3.1E-04 | 6.1E-05 | -1.6E-05 | 0 | 0 |
| S9 | 0 | 7.5E-03 | -1.7E-03 | 2.4E-04 | 3.9E-05 | -4.1E-06 | 5.7E-06 | 0 |
| S11 | 0 | 9.1E-03 | -6.4E-04 | -7.2E-06 | 1.5E-05 | -5.4E-07 | 2.8E-07 | 0 |
| S12 | 0 | 7.2E-03 | 8.4E-04 | 4.7E-05 | -1.8E-05 | -3.8E-07 | 1.2E-07 | 0 |
| S13 | 0 | -1.5E-02 | 5.2E-04 | -1.5E-05 | 2.1E-06 | -3.8E-07 | 1.1E-08 | 0 |
| S14 | 0 | -1.6E-02 | 4.5E-04 | 9.8E-06 | -8.6E-07 | -4.5E-08 | 3.9E-10 | 0 |

Fig. 6B

|  | optical lens OL1 | optical lens OL2 | optical lens OL3 |
|---|---|---|---|
| F (mm) | 3 | 3 | 4.04 |
| TTL (mm) | 7 | 8.1 | 25 |
| FNO (mm) | 2.6 | 2.6 | 2.8 |
| Y (mm) | 2.8 | 2.8 | 3.9 |
| D (mm) | 0.5 | 0.55 | 4.2 |
| FOV (degree) | 90 | 90 | 90 |
| R2 (mm) | 4 | 4.2 | 5.34 |
| R1 (mm) | 9.5 | 14.7 | 26.16 |
| H14 (mm) | 2.45 | 2.25 | 3.55 |
| h14 (mm) | 1.65 | 1.65 | 2.58 |
| F/TTL | 0.43 | 0.37 | 0.16 |
| F/Y | 1.07 | 1.07 | 1.04 |
| (FNO*TTL)/(FOV*Y) | 0.07 | 0.08 | 0.20 |
| R2/R1 | 0.42 | 0.29 | 0.20 |
| D/F | 0.17 | 0.18 | 1.04 |
| R5/R6 | 0.043 | 0 | 1.53 |
| h14/H14 | 0.67 | 0.73 | 0.73 |

Fig. 7

OPTICAL LENS

CROSS-REFERENCE TO RELATED APPLICATION

This application claims priority to Taiwan Application Serial Number 106127479, filed Aug. 14, 2017, which is herein incorporated by reference.

BACKGROUND

Field of Invention

The present invention relates to an optical lens. More particularly, the present invention relates to an optical lens with a broader field of view and a better image-forming quality.

Description of Related Art

Recently, the technology of smart phones and tablet PCs has been making great progress, and portable devices are in need of image capturing devices with higher image-forming quality. In addition, in a pursuit of thinner portable devices, the standard of the quality of optical lenses of the image capturing devices is also rising. In general, optical lenses are constituted of several lenses, and for competitive advantages in the market, making an optical lens with properties such as small-size, high resolution, and a broad field of view is an imperative goal in the Industry.

As above, a new optical lens is needed, which may increase image forming quality while maintaining a broad field of view.

SUMMARY

The invention provides an optical lens, which may increase image-forming quality while maintaining a broad field of view.

The present invention provides an optical lens. The optical lens in order from an object side to an image-forming side includes a first lens, a second lens, a third lens, a fourth lens, a fifth lens, a sixth lens, and a seventh lens. An object-side surface of the first lens has a curvature radius R1, an image-side surface of the first lens has a curvature radius R2, an object-side surface of the third lens has a curvature radius R5, an image-side surface of the third lens has a curvature radius R6, an image-side surface of the seventh lens has an inflection point, a distance between the inflection point and an optical axis is h14, and the seventh lens has a radius H14. The optical lens satisfies at least one of the following conditions:

$$0.01 \leq |R2/R1|, |R2/R1| \leq 0.6, 0 \leq |R5/R6|, |R5/R6| \leq 2,$$
$$0.3 \leq |h14/H14|, \text{ and } |h14/H14| \leq 0.9.$$

The present invention provides an optical lens. The optical lens in order from an object side to an image-forming side includes a first lens, a second lens, a third lens, a fourth lens, a fifth lens, a sixth lens, and a seventh lens. The first lens has a negative refractive power, the fourth lens has a positive refractive power, and the sixth lens has a positive refractive power. One of the second lens and the third lens hap a positive refractive power and the other one has a negative refractive power. An object-side surface of the first lens has a curvature radius R1, an image-side surface of the first lens has a curvature radius R2, an object-side surface of the third lens has a curvature radius R5, an image-side surface of the third lens has a curvature radius R6, an image-side surface of the seventh lens has an inflection point, a distance between the inflection point and an optical axis is h14, and the seventh lens has an radius H14. The optical lens satisfies at least one of the following conditions:

$$0.01 \leq |R2/R1|, |R2/R1| \leq 0.6, 0 \leq |R5/R6|, |R5/R6| \leq 2,$$
$$0.3 \leq |h14/H14|, \text{ and } |h14/H14| \leq 0.9.$$

The present invention provides an optical lens. The optical lens in order from an object side to an image-forming side includes a first lens group having a negative refractive power and a second lens group. The first lens group at least includes a first lens, a second lens, and a third lens, and two of the first lens, the second lens and the third lens have negative refractive powers and the other has a positive refractive power. The second lens group at least includes a fourth lens, a fifth lens, a sixth lens, and a seventh lens. The fourth lens and the sixth lens have positive refractive powers, and the fifth lens and the seventh lens have a positive refractive power or a negative refractive power respectively. An object-side surface of the first lens has a curvature radius R1, an image-side surface of the first lens has a curvature radius R2, an object-side surface of the third lens has a curvature radius R5, an image-side surface of the third lens has a curvature radius R6, an image-side surface of the seventh lens has an inflection point, a distance between the inflection point and an optical axis is h14, and the seventh lens has a radius H14, wherein the optical lens satisfies at least one of the following conditions:

$$0.01 \leq |R2/R1|, |R2/R1| \leq 0.6, 0 \leq |R5/R6|, |R5/R6| \leq 2,$$
$$0.3 \leq |h14/H14|, \text{ and } |h14/H14| \leq 0.9.$$

As above, the embodiment of the present invention provides an optical lens with a broad field of view and a good image-forming quality.

It is to be understood that both the foregoing general description and the following detailed description are by examples, and are Intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 4A lists parameters of each lens of the optical lens shown in FIG. 1 according to an embodiment of the present invention;

FIG. 4B lists aspherical coefficients of the aspherical surface formula of the lenses in optical lens shown in FIG. 1 according to an embodiment of the present Invention;

FIG. 5A lists parameters of each lens of the optical lens shown in FIG. 2 according to an embodiment of the present invention;

FIG. 5B lists aspherical coefficients of the aspherical surface formula of the lenses in optical lens shown in FIG. 2 according to an embodiment of the present invention;

FIG. 6A lists parameters of each lens of the optical lens shown in FIG. 3 according to an embodiment of the present invention;

FIG. 6B lists aspherical coefficients of the aspherical surface formula of the lenses in the optical lens OL3 shown in FIG. 3 according to an embodiment of the present invention; and FIG. 7 lists optical data of the optical lenses OL1, OL2, OL3 shown in FIGS. 4A, 4B, 5A, 5B, 6A, and FIG. 6B.

DETAILED DESCRIPTION

Figure 1:
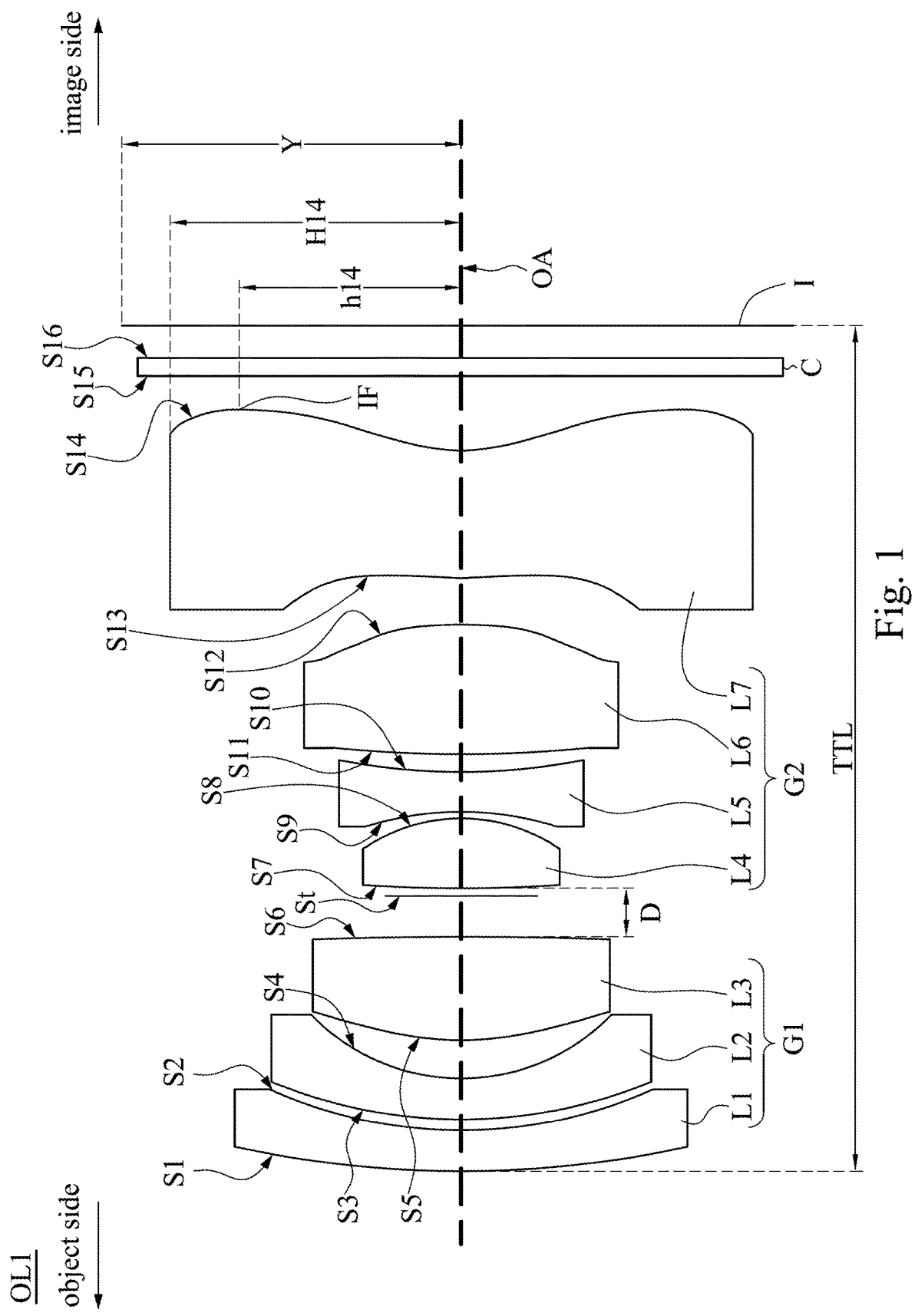
FIG. 1 illustrates an optical lens according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
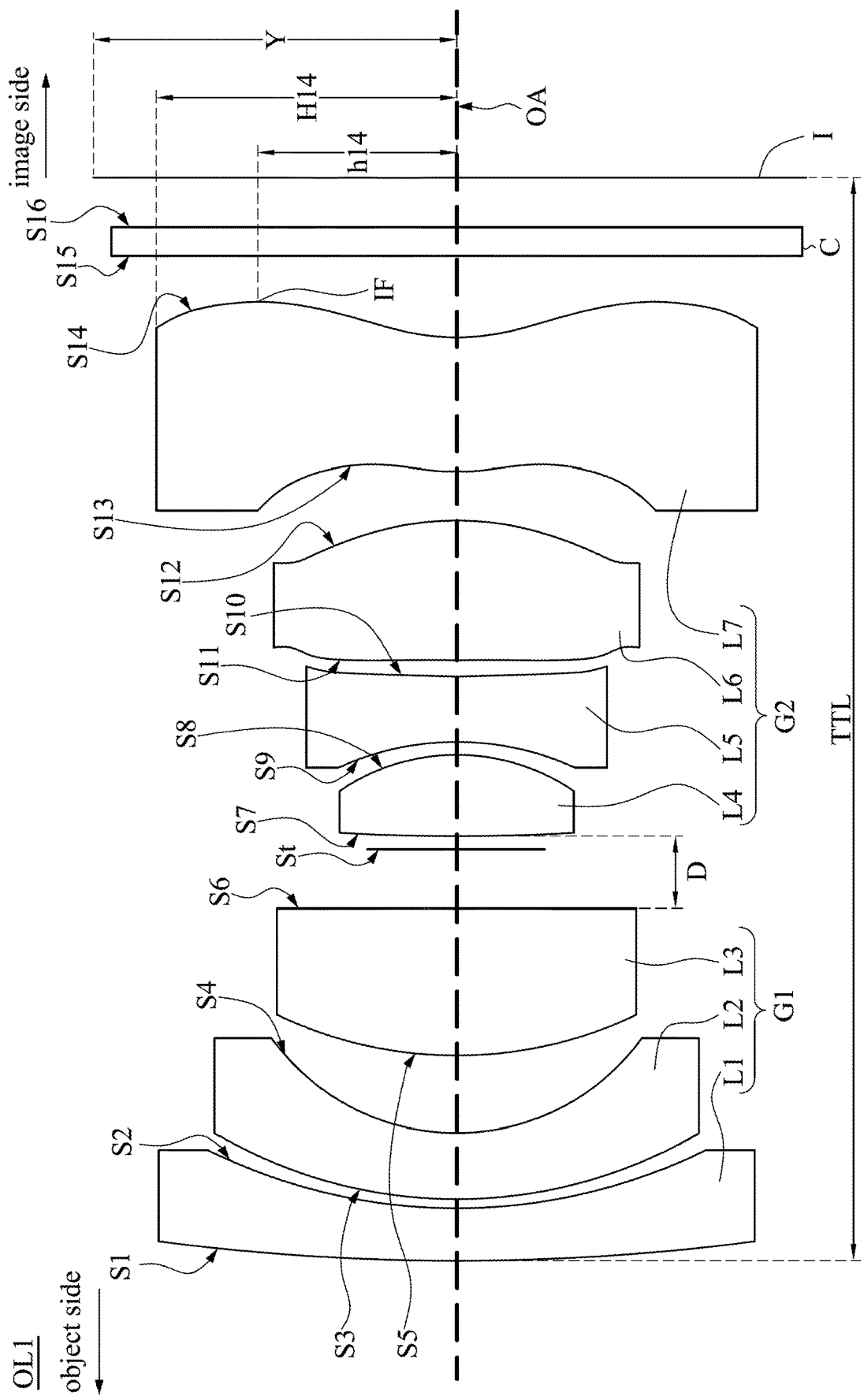
FIG. 2 illustrates an optical lens according to another embodiment of the present invention.
Figure 3:
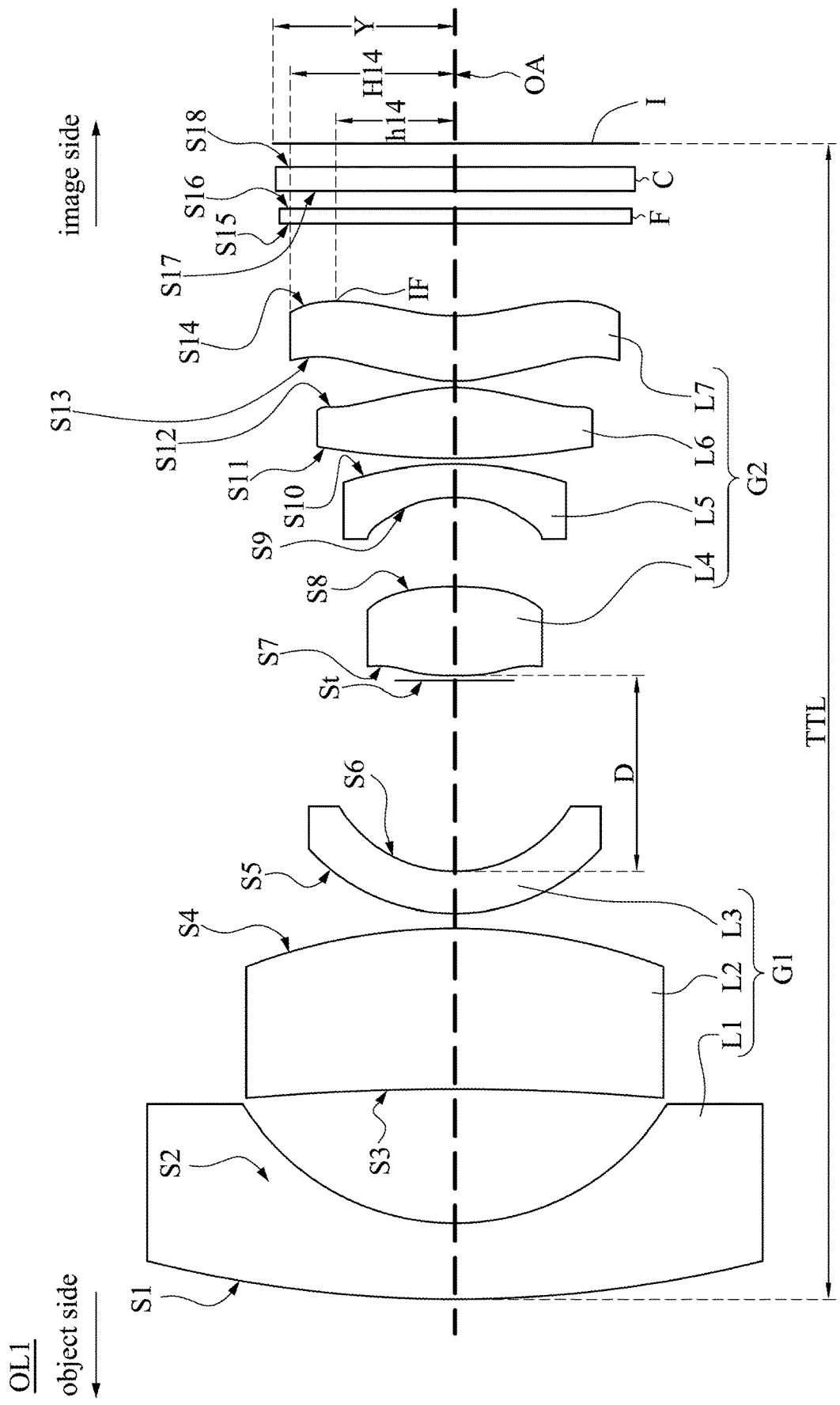
FIG. 3 illustrates an optical lens according to yet another embodiment of the present invention.

FIG. 1 illustrates an optical lens OL1 according to an embodiment of the present invention, FIG. 2 illustrates an optical lens OL2 according to another embodiment of the present invention, and FIG. 3 illustrates an optical lens OL3 according to yet another embodiment of the present invention. For lucidity, only structures related to the present embodiments are illustrated, and the rest are omitted.

The optical lenses OL1, OL2, OL3 may be a fixed focus lens or a zoom lens applicable to an electronic device capable of projecting image or capturing image. The electronic device includes but not limited to a (portable) communication device, airborne device, sport camera device, vehicle camera device, monitoring device, camera/video device, or image projection device.

In one embodiment, the optical lenses OL1, OL2, OL3, in order from an object side to an image-forming side, include a first lens group G1 and a second lens group G2. The first lens group G1 may have a negative refractive power and include a plurality of lenses; the second lens group G2 may have a refractive power, which may be a positive refractive power or a negative refractive power for example, and the second lens group G2 may include a plurality of lenses.

The first lens group G1 may at least include three lenses; the second lens group G2 may at least include four lenses. In one embodiment, the first lens group G1 includes three lenses, and any two of the lenses have negative refractive powers, and the other one of the lenses has a positive refractive power; in another embodiment, the second lens group G2 includes four lenses, and any three of the lenses have positive refractive powers, and the other one may have a negative refractive power.

Please refer to FIGS. 1, 2, and 3, the first lens group G1 from the object side to the image-forming side includes a first lens L1, a second lens L2, and a third lens L3; the second lens group G2 from the object side to the image-forming side includes a fourth lens L4, a fifth lens L5, a sixth lens L6, and a seventh lens L7.

The first lens L1 may have a negative refractive power; the fourth lens L4 and the sixth lens L6 may have positive refractive powers; the second lens L2, the third lens L3, the fifth lens L5, and the seventh lens L7 may have a positive refractive power or a negative refractive power respectively, and each of the lenses may be arranged along an optical axis OA.

In one embodiment, a refractive power of the second lens L2 has an opposite sign with respect to a refractive power of the third lens L3. For example, if one of the second lens L2 and the third lens L3 has a positive refractive power, then the other one has a negative refractive power. In other embodiment, the fifth lens L5 and the seventh lens L7 have a positive refractive power or a negative refractive power respectively; in addition, in yet another embodiment, if one of the fifth lens L5 and the seventh lens L7 has a positive refractive power, then the other one has a negative refractive power.

As shown in FIGS. 1, 2, and 3, in the first lens group G1, the third lens L3 may be the lens closest to the image-forming side, but the present invention is not limited thereto. In another embodiment, one or more lenses (not shown) with refractive powers may be disposed between the third lens L3 and the fourth lens L4, or one or more lenses (not shown) with refractive powers may be disposed at an object side of the first lens L1, or one or more lenses may be disposed between the first lens L1 and the second lens L2, or one or more lenses (not shown) with refractive powers may be disposed between the second lens L2 and third lens L3; in addition, in yet another embodiment, in the second lens group G2, the seventh lens L7 may be the lens closest to the image-forming side, but the present invention is not limited thereto. In another embodiment, one or more lenses (not shown) with refractive powers may be disposed between the seventh lens L7 and the image-forming plane I. In addition, one or more lenses (not shown) with refractive powers may be disposed between any two of the following lenses: the fourth lens L4, the fifth lens L5, the sixth lens L6, and the seventh lens L7.

In one embodiment, an object-side surface S1 of the first lens L1 has a curvature radius R1, and an image-side surface S2 of the first lens L1 has a curvature radius R2. The first lens L1 may satisfy at least one of the following conditions: $0.01 \leq |R2/R1|$, $0.1 \leq |R2/R1|$, $0.2 \leq |R2/R1|$, $|R2/R1| \leq 0.42$, $|R2/R1| \leq 0.45$, $|R2/R1| \leq 0.5$, and $|R2/R1| \leq 0.6$.

In one embodiment, an object-side surface S5 of the third lens L3 has a curvature radius R5, and an image-side surface S6 of the third lens L3 has a curvature radius R6. The third lens L3 may satisfy at least one of the following conditions: $|R5/R6|$ is substantially approximately equal to zero, $0 \leq |R5/R6|$, $0.01 \leq |R5/R6|$, $|R5/R6| \leq 1.53$, $|R5/R6| \leq 1.55$, $|R5/R6| \leq 1.6$, $|R5/R6| \leq 1.7$, $|R5/R6| \leq 1.75$, $|R5/R6| \leq 1.8$, $|R5/R6| \leq 1.9$, and $|R5/R6| \leq 2$.

Furthermore, as the third lens L3 has a positive refractive power, the curvature radius R6 may approximately equal to infinity ($R6 \rightarrow \infty$). In other words, R6 is much greater than R5 ($R6 >> R5$), the image-side surface S6 is approximately a flat surface, and/or $|R5/R6|$ is approximately equal to zero ($|R5/R6| \rightarrow 0$). In sum, the third lens L3 may satisfy conditions such as $0 \leq |R5/R6|$ and/or $0.01 \leq |R5/R6|$.

In one embodiment, the optical lenses OL1, OL2, OL3 have focal length F, and the optical lenses OL1, OL2, OL3 may satisfy at least one of the following conditions: $0.1 \leq F/TTL$, $0.15 \leq F/TTL$, $0.16 \leq F/TTL$, $F/TTL \leq 0.43$, $F/TTL \leq 0.45$, $F/TTL \leq 0.5$, and $F/TTL \leq 0.6$. TTL may denote a distance between the image-forming plane I and an object-side surface of the lens closest to the object side in optical lenses OL1, OL2, OL3; or, TTL may denote a distance between the image-forming plane I and the object-side surface S1 of the first lens L1; or, the TTL may denote a length between the image-forming plane I and the object-side surface of the first lens group G1.

In one embodiment, the optical lenses OL1, OL2, OL3 have an image height Y, and the optical lenses OL1, OL2, OL3 may satisfy one of the following conditions: $0.8 \leq F/Y$, $0.85 \leq F/Y$, $0.9 \leq F/Y$, $0.95 \leq F/Y$, $1 \leq F/Y$, $1.04 \leq F/Y$, $F/Y \leq 1.07$, $F/Y \leq 1.1$, $F/Y \leq 1.15$, $F/Y \leq 1.2$, $F/Y \leq 1.25$, and $F/Y \leq 1.3$.

In addition, the optical lenses OL1, OL2, OL3 have a field of view FOV, and the optical lenses OL1, OL2, OL3 may satisfy one of the following conditions: $75° \leq FOV$, $80° \leq FOV$, $85° \leq FOV$, $90° \leq FOV$, $FOV \leq 95°$, $FOV \leq 100°$, and $FOV \leq 105°$.

In one embodiment, the optical lenses OL1, OL2, OL3 have an aperture with an aperture number FNO, and the optical lenses OL1, OL2, OL3 may satisfy at least one of the following conditions: 0<(FNO×TTL)/(FOV×Y), 0.05≤(FNO×TTL)/(FOV×Y), 0.07≤(FNO×TTL)/(FOV×Y), (FNO×TTL)/(FOV×Y)≤0.2, (FNO×TTL)/(FOV×Y)≤0.25, and (FNO×TTL)/(FOV×Y)≤0.3.

In one embodiment, a distance between an image-side surface of the first lens group G1 and an object-side surface of the second lens group G2 is D, and the optical lenses OL1, OL2, OL3 may satisfy at least one of the following conditions: 0<|D/F|, 0.1≤|D/F|, 0.15≤|D/F|, 0.17≤|D/F|, |D/F|≤1.04, |D/F|≤1.05, |D/F|≤1.1, |D/F|≤1.15, |D/F|≤1.2, and |D/F|≤1.25. In particular, the distance D may be a distance between a center of the image-side surface S6 of the third lens L3 and a center of an object-side surface S7 of the fourth lens L4; or, the distance D may be a length between the image-side surface 86 and the object-side surface S7 along the optical axis OA.

In one embodiment, the seventh lens L7 is an aspherical lens, and an Image-side surface S14 of the seventh lens L7 is an aspherical surface having at least one inflection point IF. A distance between the inflection point IF and the optical axis OA is h14, and the seventh lens L7 has a radius H14. The optical lenses OL1, OL2, OL3 may satisfy at least one of the following conditions: 0.35≤|h14/H14|, 0.35≤|h14/H14|, 0.4≤|h14/H14|, 0.45≤|h14/H14|, 0.5≤|h14/H14|, 0.55≤|h14/H14|, 0.65≤|h14/H14|, 0.67≤|h14/H14|, |h14/H14|≤0.73, |h14/H14|≤0.75, |h14/H14|≤0.85, and |h14/H14|≤0.9. In particular, h14 may be the shortest distance or a vertical distance between the Inflection point IF of the seventh lens L7 and the optical axis OA. In addition, the inflection point IF may be located on the image-side surface S14 and between the optical axis OA and a periphery of the seventh lens L7; H14 may be a half of a physical diameter or an optical effective diameter of the seventh lens L7, or H14 may be a distance (for example, it may be the shortest distance or a vertical distance) between an optical effective periphery φ7 of the seventh lens L7 and the optical axis OA.

Furthermore, as the third lens L3 has a positive refractive power, the seventh lens L7 may be the lens having the largest optical effective periphery φ7 among all the lenses (the first lens L1 to the seventh lens L7).

The first lens L1 has a refractive index N1 and an abbe number V1, the second lens L2 has a refractive index N2 and an abbe number V2, the fourth lens L4 has a refractive index N4 and an abbe number V4, the fifth lens L5 has a refractive index N5 and an abbe number V5, the sixth lens L6 has a refractive index N6 and an abbe number V6, the seventh lens L7 has a refractive index N7 and an abbe number V7.

In one embodiment, the optical lenses OL1, OL2, OL3 may satisfy at least one of the following conditions: 0.01≤|N1−N2|, 0.05≤|N1−N2|, 0.1≤|N1−N2|, |N1−N2|≤0.2, |N1−N2|≤0.25, |N1−N2|≤0.3, |N1−N2|≤0.35, 0.01≤|N3−N2|, 0.05≤|N3−N2|, 0.1≤|N3−N2|, 0.15≤|N3−N2|, 0.2≤|N3−N2|, 0.25≤|N3−N2|, |N3−N2|≤0.3, |N3−N2|≤0.35, |N3−N2|≤0.4, |N3−N2|≤0.45, |N3−N2|≤0.5, 0<N5−N4, 0.01≤N5−N4, 0.05≤N5−N4, 0.1≤N5−N4, N5−N4≤0.15, N5−N4≤0.2, N5−N4≤0.25, N5−N4≤0.3, N5−N4≤0.35, N5−N4≤0.4, 0<N5−N6, 0.01≤N5−N6, 0.05≤N5−N6, 0.15≤N5−N6, N5−N6≤0.15, N5−N6≤0.2, N5−N6≤0.25, N5−N6≤0.3, N5−N6≤0.35, N5−N6≤0.4, 0<N5−N7, 0.01≤N5−N7, 0.05≤N5−N7, 0.1≤N5−N7, N5−N7≤0.15, N5−N7≤0.2, N5−N7≤0.25, N5−N7≤0.3, N5−N7≤0.35, N5−N7≤0.4, 0≤|V2−V1|, 3≤|V2−V1|, 5≤|V2−V1|, |V2−V1|≤17, |V2−V1|≤20, |V2−V1|≤25, |V2−V1|≤30, 3≤|V2−V3|, 5≤|V2−V3|, 10≤|V2−V3|, 15≤|V2−V3|, |V2−V3|≤18, |V2−V3|≤20, |V2−V3|≤25, |V2−V3|≤30, |V2−V3|≤35, 5≤V4−V5, 10≤V4−V5, 15≤V4−V5, 20≤V4−V5, 25≤V4−V5, 30≤V4−V5, 31≤V4−V5, V4−V5≤58, V4−V5≤60, V4−V5≤65, V4−V5≤70, 5≤V6−V5, 10≤V6−V5, 15≤V6−V5, 20≤V6−V5, 25≤V6−V5, 30≤V6−V5, 31≤V6−V5, V6−V5≤32, V6−V5≤35, V6−V5≤40, V6−V5≤45, V6−V5≤50, V6−V5≤55, V6−V5≤60, 55≤V7−V5, 10≤V7−V5, 15≤V7−V5, 20≤V7−V5, 25≤V7−V5, 30≤V7−V5, 31≤V7−V5, V7−V5≤32, V7−V5≤35, V7−V5≤40, V7−V5≤45, V7−V5≤50, V7−V5≤55, and V7−V5≤60.

In addition, in one embodiment, the first lens L1, the second lens L2, the third lens L3, the fourth lens L4, the fifth lens L5, the sixth lens L6, and the seventh lens L7 may be implemented as glass lenses; in another embodiment, at least one of the lenses mentioned above may be implemented as a plastic lens; in yet another embodiment, the first lens L1 and the third lens L3 may be glass lenses, and the second lens L2, the fourth lens L4, the fifth lens L5, the sixth lens L6, and the seventh lens L7 may be plastic lenses. The glass lenses may be made of glass materials, and the plastic lenses may be made of plastic materials. For example, the plastic materials may include but not limited to polycarbonate, cycloolefin copolymer (APEL for example), polyester resin (OKP4 or OKP4HT for example) and else, or may include a mixture material and/or a compound material including at least one of the aforementioned materials.

The first lens L1, the second lens L2, the third lens L3, the fourth lens L4, the fifth lens L5, the sixth lens L6, and the seventh lens L7 may be a spherical lens, a free-form lens, or an aspherical lens respectively. In one embodiment, the first lens L1 may be a spherical lens, the second lens L2 and the third lens L3 may be a spherical lens, an aspherical lens, or a free-form lens respectively, and the fourth lens L4, the fifth lens L5, the sixth lens L6, and the seventh lens L7 may be an aspherical lens or a free-from lens respectively.

In particular, every free-form lens has at least one free-form surface, which means an object-side surface or/and an image-side surface of the free-form lens is a free-form surface; every aspherical lens has at least one aspherical surface, which means an object-side surface or/and an image-side surface of the aspherical lens is an aspherical surface. In addition, every aspherical surface may be described by the following formula:

$$Z = \left[\frac{(C * Y^2)}{1 + \sqrt{1 - (K+1)C^2 Y^2}}\right] + \sum (A_i * Y^i)$$

In which, Z is a coordinate value on the optical axis OA, positive value denotes light propagating direction; $A_i$ is an aspherical constant, in which i=4, 6, 8, 10, or 12; K is a quadratic surface coefficient; C is a reciprocal of curvature radius r (C=1/r); Y is a coordinate value in a direction orthogonal to the optical axis OA, positive value denotes a direction leaving the optical axis OA. Furthermore, every parameter or coefficient of the aspherical surface formula may be independent from each other.

As shown in FIG. 1 to FIG. 3, the object-side surface 81 and the Image-side surface S2 of the first lens L1 of the optical lenses OL1, OL2, OL3 may have positive refractive powers on the optical axis OA. The object-side surface S1 may be a convex surface protruding towards the object side; the image-side surface S2 may be a concave surface recessing towards the object side. Furthermore, the first lens L1 may be a convex-concave glass lens or a convex-concave plastic lens.

An object-side surface S3 and an image-side surface S4 of the second lens L2 may have a positive refractive power or a negative refractive power on the optical axis OA. The object-side surface S3 may be a convex surface protruding towards the object side or a concave surface recessing towards the image-forming side; the image-side surface S4 may be a concave surface recessing towards the object side or a convex surface protruding towards the image-forming side. Furthermore, the second lens L2 may be a convex-concave glass lens, a convex-concave plastic lens, a concave-convex glass lens, or a concave-convex plastic lens.

The object-side surface S5 of the third lens L3 may have a positive refractive power on the optical axis OA, and the image-side surface S6 of the third lens L3 may have a negative refractive power, a positive refractive power, or an infinite refractive power on the optical axis OA. The object-side surface S5 may be a convex surface protruding towards the object side; the image-side surface S6 may be a convex surface protruding towards the image-forming side, a concave surface recessing towards the object side, or a piano surface approximately or substantially flat. Furthermore, the third lens L3 may be a biconvex lens, a convex-piano lens, or a convex-concave lens, which may be made of glass or plastic.

The object-side surface S7 of the fourth lens L4 may have a positive refractive power on the optical axis OA, and an image-side surface S8 of the fourth lens L4 may have a negative refractive power on the optical axis OA. The object-side surface S7 may be a convex surface protruding towards the object side; the image-side surface S8 may be a convex surface protruding towards the image-forming side. Furthermore, the fourth lens L4 may be a biconvex glass lens or a biconvex plastic lens.

An object-side surface S9 of fifth lens L5 may have a negative refractive power on the optical axis OA, an image-side surface S10 of the fifth lens L5 may have a positive refractive power or a negative refractive power on the optical axis OA. The object-side surface S9 may be a concave surface recessing towards the image-forming side or a convex surface protruding towards the image-forming side. Furthermore, the fifth lens L5 may be a biconcave glass lens, a concave-convex glass lens, a biconcave plastic lens, or a concave-convex plastic lens.

An object-side surface 311 and an image-side surface S12 of the sixth lens L6 may have positive refractive powers on the optical axis OA. The object-side surface S11 may be a concave surface recessing (or slightly recessing) towards the image-forming side; the image-side surface S12 may be a convex surface protruding towards the image-forming side. Furthermore, the sixth lens L6 may be a concave-convex glass lens, a concave-convex plastic lens, or a concave-convex glass or plastic lens with slightly recessing concave surface.

An object-side surface S13 and the image-side surface S14 of the seventh lens L7 may have a positive refractive power on the optical axis OA. The object-side surface S13 may be a convex surface with a central area protruding towards the object side, and a peripheral area (an area between the center and periphery) of the object-side surface 313 may be a concave surface extending towards the image-forming side at an inner part and extending towards the object side at an outer part; a central area of the image-side surface S14 may recess towards the object side. Furthermore, the seventh lens L7 may be a biconcave glass lens, a biconcave plastic lens, a convex-concave glass lens, or a convex-concave plastic lens. Both of the object-side surface S13 and the image-side surface S14 may be an aspherical surface or a free-form surface, or any one of them may be a spherical surface.

In addition, the optical lenses OL1, OL2, OL3 may further include an aperture stop St and/or a protection cover C; an image capturing unit (not shown) may be disposed on the image-forming plane I, and thus light rays passing through the optical lenses OL1, OL2, OL3 may undergo an optical-electro conversion process performed by the image capturing unit. The aperture stop St may be disposed between any two of the lenses L1-L7 of the optical lenses OL1, OL2, OL3, at the object side of the first lens L1, or between the seventh lens L7 and the image-forming plane I. For example, the aperture stop St may be disposed between the third lens L3 and the fourth lens L4, but the present disclosure is not limited thereto; the protection cover C may be disposed between the seventh lens L7 and the image-forming plane I.

In another aspect, the protection cover C may protect the image capturing unit and filter out the infrared light at the same time; or, as shown by the optical lens OL3, which may further includes a filter F, and the filter F may also be disposed between the seventh lens L7 and the image-forming plane I.

FIG. 4A lists parameters of each lens of optical lens OL1 shown in FIG. 1 according to an embodiment of the present invention, in which FIG. 4A includes radius curvature, thickness, refractive index, abbe number (dispersion coefficient), and radius. The reference number of surfaces of the lenses are arranged in order from the object side to the image-forming side, for example, "St" denotes the aperture stop, "S1" denotes the object-side surface of the first lens L1, "S2" denotes the image-side surface of the first lens L1 . . . "S15" and "S16" denote an object-side surface and an image-side surface of the protection cover C respectively. In addition, the thickness denotes a distance from a surface to a surface next to it at the image-forming side. For example, the "thickness" of the image-side surface 81 denotes the distance from the object-side surface S1 of the first lens L1 to the image-side surface S2 of the second lens L1; the "thickness" of the image-side surface S2 denotes the distance from the image-side surface S2 of the first lens L1 to the object-side surface S3 of the second lens L2.

FIG. 4B lists aspherical coefficients of the aspherical surface formula of the lenses in optical lens OL1 shown in FIG. 1 according to an embodiment of the present invention. If the object-side surfaces S3, S7, S9, S11, S13 and the image-side surfaces 84, S8, S10, S12, S14 are aspherical surfaces, then aspherical coefficients of each of these aspherical surfaces are shown in FIG. 4B.

FIG. 5A lists parameters of each lens of optical lens OL2 shown in FIG. 2 according to an embodiment of the present invention, in which the definition of the parameters in FIG. 5A are generally the same as those shown in FIG. 4A.

Furthermore, with reference made to FIG. 4A and FIG. 5A, the third lens L3 may satisfy at least one of the following conditions: |R5/R6|≤0.043, |R5/R6|≤0.05, |R5/R6|≤0.06, |R5/R6|≤0.07, |R5/R6|≤0.08, and |R5/R6|≤0.09.

FIG. 5B lists aspherical coefficients of the aspherical surface formula of the lenses in optical lens OL2 shown in FIG. 2 according to an embodiment of the present invention. If the object-side surfaces S3, S7, S9, 11, 813 and the image-side surfaces S4, S8, 810, S12, S14 are aspherical surfaces, then aspherical coefficients of each of these aspherical surfaces are shown in FIG. 5B.

FIG. 6A lists parameters of each lens of optical lens OL3 shown in FIG. 3 according to an embodiment of the present invention, in which the definition of the parameters in FIG. 6A are generally the same as those shown in FIG. 4A.

Furthermore, with reference made to FIG. 5A and FIG. 6A, the third lens L3 may satisfy at least one of the following conditions: $0.02 \le |R5/R6|$, $0.03 \le |R5/R6|$, $0.03 \le |R5/R6|$, $0.04 \le |R5/R6|$, $0.043 \le |R5/R6|$.

FIG. 6B lists aspherical coefficients of the aspherical surface formula of the lenses in optical lens OL3 shown in FIG. 3 according to an embodiment of the present invention. If the object-side surfaces S3, S7, 89, S11, 813 and the image-side surfaces S4, S8, S10, S12, S14 are aspherical surfaces, then aspherical coefficients of each of these aspherical surfaces are shown in FIG. 6B.

FIG. 7 lists optical data of the optical lenses OL1, OL2, OL3 shown in FIGS. 4A, 4B, 5A, 5B, 6A, and FIG. 6B.

As above, It should be understood that the optical lenses OL1, OL2, OL3 have a broader field of view and a better distortion correction, and thus the optical lenses OL1, OL2, OL3 have a broad field of view and a good image forming quality.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical lens, in order from an object side to an image-forming side, consisting of:

a first lens, a second lens, a third lens, a fourth lens, a fifth lens, a sixth lens, and a seventh lens, an object-side surface of the first lens has a curvature radius R1, an image-side surface of the first lens has a curvature radius R2, and the optical lens satisfies $0.01 \le |R2/R1| \le 0.6$; an object-side surface of the fifth lens has a negative curvature radius, an object-side surface of the sixth lens has a negative curvature radius, an object-side surface of the third lens has a curvature radius R5, an image-side surface of the third lens has a curvature radius R6, the fourth lens has a refractive index N4, the fifth lens has a refractive index N5, the sixth lens has a refractive index N6, an image-side surface of the seventh lens has an inflection point, a distance between the inflection point and an optical axis is h14, and the seventh lens has a radius H14 and a refractive index N7, N4=N7, and the optical lens satisfies at least one of the following conditions:

$0 < N5 - N6 \le 0.4$;

$0 \le |R5/R6| \le 2$; and $0.3 \le |h14/H14| \le 0.9$.

2. The optical lens of claim 1, wherein the optical lens has a focal length F, a distance between the image-side surface of the third lens and an object-side surface of the fourth lens is D, and $0 < |D/F1| \le 1.25$.

3. The optical lens of claim 1, wherein the optical lens has a focal length F, a field of view FOV, an image height Y, an aperture number FNO, a distance between the object-side surface of the first lens and an image-forming plane is TTL, and the optical lens satisfies at least one of the following conditions:

$0.1 \le F/TTL \le 0.6$, $75° \le FOV \le 105°$, $0.8 \le F/Y \le 1.3$, $0 < (FNO \times TTL)/(FOV \times Y) \le 0.3$.

4. The optical lens of claim 1, wherein the first lens has a refractive index N1 and an abbe number V1, the second lens has a refractive index N2 and an abbe number V2, the third lens has a refractive index N3 and an abbe number V3, the fourth lens has a refractive index N4 and an abbe number V4, the fifth lens has an abbe number V5, the sixth lens has an abbe number V6, the seventh lens has a refractive index N7 and an abbe number V7, and the optical lens satisfies at least one of the following conditions:

$0.01 \le |N1-N2| \le 0.35$, $0.01 \le |N3-N2| \le 0.5$, $0 \le |V2-V1| \le 30$, $3 \le |V2-V3| \le 35$, $5 \le V4-V5 \le 70$, and $5 \le V7-V5 \le 60$, $0 < N5-N4 \le 0.4$, $0 < N5-N7 \le 0.4$, and $5 \le V6-V5 \le 60$.

5. The optical lens of claim 1, wherein the third lens has a positive refractive power, and an effective diameter of the seventh lens is larger than an effective diameter of the first lens, an effective diameter of the second lens, an effective diameter of the third lens, an effective diameter of the fourth lens, an effective diameter of the fifth lens and an effective diameter of the sixth lens.

6. The optical lens of claim 1, wherein at least one of the first lens and the third lens is glass lens; at least one of the second lens, the fourth lens, the fifth lens, the sixth lens and the seventh lens is plastic lens.

7. The optical lens of claim 1, wherein the first lens is a convex-concave lens; the second lens is a convex-concave lens or a concave-convex lens; the third lens is a biconvex lens, a convex-plano lens or a convex-concave lens; the fourth lens is a biconvex lens; the fifth lens is a biconcave lens or a concave-convex lens; the sixth lens is a concave-convex lens; and, the seventh lens is a biconcave lens or a convex-concave lens.

8. An optical lens, from an object side to an image-forming side, consisting of:

a first lens, a second lens, a third lens, a fourth lens, a fifth lens, a sixth lens and a seventh lens; the first lens has a negative refractive power, the fourth lens has a positive refractive power, the sixth lens has a positive refractive power; one of the second lens and the third lens has a positive refractive power and the other one has a negative refractive power; an object-side surface of the first lens has a curvature radius R1, an image-side surface of the first lens has a curvature radius R2, and the optical lens satisfies $0.01 \le |R2/R1| \le 0.6$; an object-side surface of the fifth lens has a negative curvature radius, an object-side surface of the sixth lens has a negative curvature radius, the fourth lens has a refractive index N4, the fifth lens has a refractive index N5 and an abbe number V5, the sixth lens has a refractive index N6 and an abbe number V6, the seventh lens has a refractive index N7, N4=N7, and the optical lens satisfies at least one of the following conditions:

$0 < N5-N4 \le 0.4$, $0 < N5-N6 \le 0.4$, $0 < N5-N7 \le 0.4$, and $5 \le V6-V5 \le 60$.

9. The optical lens of claim 8, wherein the optical lens has a focal length F, a distance between the image-side surface of the third lens and an object-side surface of the fourth lens is D, and $0 < |D/F| \le 1.25$.

10. The optical lens of claim 8, wherein the optical lens has a focal length F, a field of view FOV, an image height Y, an aperture number FNO, a distance between the object-side surface of the first lens and the image-forming plane is TTL, and the optical lens satisfies at least one of the following conditions:

$$0.1 \leq F/TTL \leq 0.6,\ 75° \leq FOV \leq 105°,\ 0.8 \leq F/Y \leq 1.3,$$
$$0 < (FNO \times TTL)/(FOV \times Y) \leq 0.3.$$

11. The optical lens of claim 8, wherein the first lens has a refractive index N1 and an abbe number V1, the second lens has a refractive index N2 and an abbe number V2, the third lens has a refractive index N3 and an abbe number V3, the fourth lens has an abbe number V4, the seventh lens has an abbe number V7, and the optical lens satisfies at least one of the following conditions:

$$0.01 \leq |N1-N2| \leq 0.35,\ 0.01 \leq |N3-N2| \leq 0.5,\ 0 \leq |V2-V1| \leq 30,\ 3 \leq |V2-V3| \leq 35,\ 5 \leq V4-V5 \leq 70,\ \text{and}\ 5 \leq V7-V5 \leq 60.$$

12. The optical lens of claim 8, wherein the third lens has a positive refractive power, and an effective diameter of the seventh lens is larger than an effective diameter of the first lens, an effective diameter of the second lens, an effective diameter of the third lens, an effective diameter of the fourth lens, an effective diameter of the fifth lens and an effective diameter of the sixth lens.

13. An optical lens, from an object side to an image-forming side, consisting of:
a first lens group having a negative refractive power and consisting of a first lens, a second lens and a third lens, and two of the first lens, the second lens and the third lens have negative refractive powers and the other has a positive refractive power, an object-side surface of the first lens has a curvature radius R1, an image-side surface of the first lens has a curvature radius R2, the optical lens satisfies $0.01 \leq |R2/R1| \leq 0.6$, an object-side surface of the third lens has a curvature radius R5, and an image-side surface of the third lens has a curvature radius R6; and
a second lens group, consisting of a fourth lens, a fifth lens, a sixth lens and a seventh lens, the fourth lens and the sixth lens have positive refractive powers, one of the fifth lens and the seventh lens has a positive refractive power, and the other one of the fifth lens and the seventh lens has a negative refractive power, an object-side surface of the fifth lens has a negative curvature radius, an object-side surface of the sixth lens has a negative curvature radius, an image-side surface of the seventh lens has an inflection point, a distance between the inflection point and an optical axis is h14, and the seventh lens has a radius H14, and the optical lens satisfies at least one of the following conditions:
the third lens has a positive refractive power;

$$0 \leq |R5/R6| \leq 2;\ \text{and}$$
$$0.3 \leq |h14/H14| \leq 0.9.$$

14. The optical lens of claim 13, wherein the optical lens has a focal length F, a distance between the image-side surface of the third lens and an object-side surface of the fourth lens is D, and $0 < |D/F| \leq 1.25$.

15. The optical lens of claim 13, wherein the optical lens has a focal length F, a field of view FOV, an image height Y and an aperture number FNO, a distance between the object-side surface of the first lens and the image-forming plane is TTL, and the optical lens satisfies at least one of the following conditions:

$$0.1 \leq F/TTL \leq 0.6,\ 75° \leq FOV \leq 105°,\ 0.8 \leq F/Y \leq 1.3,$$
$$0 \leq (FNO \times TTL)/(FOV \times Y) \leq 0.3.$$

16. The optical lens of claim 13, wherein the first lens has a refractive index N1 and an abbe number V1, the second lens has a refractive index N2 and an abbe number V2, the third lens has a refractive index N3 and an abbe number V3, the fourth lens has a refractive index N4 and an abbe number V4, the fifth lens has a refractive index N5 and an abbe number V5, the sixth lens has a refractive index N6 and an abbe number V6, the seventh lens has a refractive index N7 and an abbe number V7, and the optical lens satisfies at least one of the following conditions:

$$0.01 \leq |N1-N2| \leq 0.35,\ 0.01 \leq |N3-N2| \leq 0.5,\ 0 \leq |V2-V1| \leq 30,\ 3 \leq |V2-V3| \leq 35,\ 5 \leq V4-V5 \leq 70,\ 5 \leq V7-V5 \leq 60,\ 0 < N5-N4 \leq 0.4,\ 0 < N5-N6 \leq 0.4,\ 0 < N5-N7 \leq 0.4,\ \text{and}\ 5 \leq V6-V5 \leq 60.$$

17. The optical lens of claim 13, wherein the third lens has a positive refractive power, and an effective diameter of the seventh lens is largest among an effective diameter of the first lens, an effective diameter of the second lens, an effective diameter of the third lens, an effective diameter of the fourth lens, an effective diameter of the fifth lens and an effective diameter of the sixth lens.

18. The optical lens of claim 1, wherein
the third lens has a positive refractive power.

19. The optical lens of claim 8, wherein the optical lens satisfies at least one of the following conditions:
the third lens has a positive refractive power;
an object-side surface of the third lens has a curvature radius R5, an image-side surface of the third lens has a curvature radius R6, and $0 \leq |R5/R6| \leq 2$; and
an image-side surface of the seventh lens has an inflection point, a distance between the inflection point and an optical axis is h14, and the seventh lens has a radius H14, and $0.3 \leq |h14/H14| \leq 0.9$.

\* \* \* \* \*